United States Patent

Jackel

[11] Patent Number: 5,613,582
[45] Date of Patent: Mar. 25, 1997

[54] HYDROKINETIC TORQUE CONVERTER

[75] Inventor: Herr J. Jackel, Baden-Baden, Germany

[73] Assignee: LuK Lamellen und Kupplungsbau GmbH, Bühl, Germany

[21] Appl. No.: 332,549

[22] Filed: Oct. 28, 1994

[30] Foreign Application Priority Data

Oct. 29, 1993 [DE] Germany ............. 43 37 118.3
Sep. 19, 1994 [DE] Germany ............. 44 33 256.4

[51] Int. Cl.$^6$ .................................................. F16D 33/00
[52] U.S. Cl. ................... 192/3.29; 192/3.3; 192/103 F
[58] Field of Search ........................... 192/3.29, 3.28, 192/3.31, 3.33, 103 F

[56] References Cited

U.S. PATENT DOCUMENTS 5,456,343 10/1995 Murata et al. .................... 192/3.29

FOREIGN PATENT DOCUMENTS

3823210A1 7/1988 Germany .

Primary Examiner—Andrea L. Pitts
Attorney, Agent, or Firm—Darby & Darby

[57] ABSTRACT

A hydrokinetic torque converter has a rotary housing which is connectable to the crankshaft or camshaft of a combustion engine in a motor vehicle to drive the input shaft of the transmission. The housing confines a turbine, a pump, a stator (if necessary) and a lockup clutch between a radially extending wall of the housing and the turbine. A piston of the lockup clutch is movable in the axial direction of the housing and defines a first fluid-filled compartment with the turbine as well as a second fluid-filled compartment with the wall of the housing. The force which is required to engage, to partially disengage or to fully disengage the lockup clutch is reduced by the provision of one or more profiles on the piston and/or on a friction disc of the lockup clutch which extends or extend into the adjacent compartment or compartments to influence the speed of circulation of fluids in the respective compartments and/or the fluid pressures acting upon opposite sides of the piston. This enables a control unit to predictably and reliably change the condition of the lockup clutch (from engaged to partially engaged (slipping) to fully disengaged or in the opposite direction) in response to relatively small changes of fluid pressure in the first or in the second compartment.

23 Claims, 2 Drawing Sheets 5,613,582

HYDROKINETIC TORQUE CONVERTER

BACKGROUND OF THE INVENTION

The invention relates to improvements in torque converters and, more particularly, to improvements in hydrokinetic torque converters which are equipped with so-called lockup or bypass clutches.

A hydrokinetic torque converter normally comprises a rotary housing which can be affixed to the output element of a prime mover, such as a combustion engine in a motor vehicle. It normally includes a wall extending substantially radially of the axis of rotation of the housing and disposed between the output element of the prime mover and the turbine of the torque converter. The lockup clutch is installed between the radially extending wall of the housing and the turbine, as seen in the axial direction of the housing. As a rule, the lockup clutch comprises a lamella, which constitutes a friction disc, that cooperates with an axially movable piston of the lockup clutch. The piston is displaceable in directions toward and away from the wall of the housing in response to the establishment of a pressure differential between the bodies of hydraulic fluid at opposite sides of the piston. Reference may be had, for example, to published German patent application Serial No. 38 23 210. Reference may also be had to U.S. Pat. No. 4,969,543 granted Nov. 13, 1990 to Macdonald for "Slipping Bypass Clutch Construction for a Hydrokinetic Torque Converter" and/or to commonly owned Copending patent application Ser. No. 08/272, 920 filed Jul. 8, 1994 by Dieter Otto and Volker Middlemann for "Hydrokinetic Torque Converter and Lockup Clutch Therefor".

OBJECTS OF THE INVENTION

An object of the invention is to provide a novel and improved hydrokinetic torque converter which embodies or is equipped with a lockup clutch or bypass clutch and whose lockup clutch can be engaged or disengaged in response to the establishment of relatively small pressure differentials at the opposite sides of the piston forming part of the lockup clutch.

Another object of the invention is to provide a novel and improved lockup clutch or bypass clutch which can be utilized in or in conjunction with a hydrokinetic torque converter and which is designed to ensure an optimal transmission of torque under a variety of circumstances of use of the torque converter.

A further object of the invention is to provide a lockup clutch or bypass clutch which can be partially or completely engaged or disengaged under a wide variety of circumstances of use of the torque converter and in response to the action of a fluid which need not be maintained at an elevated pressure.

An additional object of the invention is to provide a lockup clutch which can be reliably engaged or disengaged in response to the action of a hydraulic fluid whose pressure need not exceed that which is necessary to engage or disengage a conventional lockup clutch.

Still another object of the invention is to provide a lockup clutch which is constructed and assembled to ensure the establishment of an optimum relationship between the magnitudes of forces furnished by bodies of hydraulic fluid acting upon opposite sides of the piston forming part of such lockup clutch.

A further object of the invention is to provide a lockup clutch which can be used in or with a hydrokinetic torque converter, and which is constructed and assembled in such a way that its operation is not adversely affected by the dynamic and/or kinematic behavior of hydraulic fluid in the housing of the torque converter.

Another object of the invention is to provide a lockup clutch which is constructed and assembled in such a way that it can take advantage of the parameters of bodies of fluid acting upon the axially movable piston of the clutch to ensure predictable and reliable disengagement, partial engagement or full engagement of the clutch.

An additional object of the invention is to provide a lockup clutch or bypass clutch which is constructed and assembled in such a way that the forces acting upon opposite sides of its axially movable piston can be accurately and reliably balanced to thus ensure that the piston is not acted upon by a resultant force corresponding to the difference between the magnitudes of the forces acting upon the opposite sides of the piston.

Still another object of the invention is to provide a relatively simple and inexpensive lockup clutch and a relatively simple and inexpensive hydrokinetic torque converter which embodies or cooperates with such lockup clutch.

A further object of the invention is to provide a vehicle, particularly an engine-driven motor vehicle, which embodies the above-outlined hydrokinetic torque converter and/or the above-outlined lockup clutch.

Another object of the invention is to provide a novel and improved combination of a hydrokinetic torque converter and a lockup clutch which can be utilized as a superior substitute for conventional torque converter-lockup clutch combinations.

An additional object of the invention is to provide a novel and improved method of combining a lockup clutch with a hydrokinetic torque converter.

Still another object of the invention is to provide a novel and improved method of regulating the operation of the aforementioned combination of a lockup clutch and a hydrokinetic torque converter.

A further object of the invention is to provide a novel and improved friction disc for use in the above-outlined lockup clutch.

Another object of the invention is to provide a novel and improved piston or pressure plate for use in the above-outlined lockup clutch.

An additional object of the invention is to provide a novel and improved turbine for use in a hydrokinetic torque converter which embodies or cooperates with the aforementioned lockup clutch and can be utilized in the power train between the prime mover and one or more driven components of a motor vehicle.

Still another object of the invention is to provide novel and improved vibration damping or suppressing means between the output element of the lockup clutch and the part or parts receiving torque from the turbine of the hydrokinetic torque converter.

SUMMARY OF THE INVENTION

One feature of the present invention resides in the provision of a hydrokinetic torque converter which comprises a housing rotatable about a predetermined axis by an output element (e.g., a rotary camshaft or crankshaft) of an engine in a vehicle (particularly a combustion engine in a motor vehicle) and defining a chamber for a pressurizable hydraulic fluid which is caused to circulate in response to rotation of the output element. The housing comprises a wall which extends substantially radially of the axis between a rotary turbine of the torque converter and the output element of the engine. The torque converter further comprises a lockup clutch or bypass clutch which is disposed in the chamber between the wall of the housing and the turbine and includes at least one friction disc which is rotatable with the turbine, and a piston which is disposed between the wall and the turbine. The piston divides the chamber into a first compartment adjacent the turbine and a second or further compartment adjacent the wall. The piston is movable in the direction of the axis in response to the establishment of pressure differentials between the fluids in the first and second or further compartments. The lockup clutch is at least partially engaged (such term is intended to denote full engagement of the clutch as well as an engagement involving at least some slippage between the input and output components of the clutch) in response to a rise in fluid pressure in the first compartment (e.g., due to axial movement of the piston toward the wall to frictionally engage the at least one disc with the wall), and the lockup clutch is disengaged in response to a rise in fluid pressure in the second or further compartment (e.g., as a result of axial movement of the piston away from the wall). The torque converter further comprises means for reducing differences developing between a lower speed of circulation of fluid in the first compartment and a higher speed of circulation of fluid in the second or further compartment when the clutch is at least partially disengaged (i.e., when the clutch is disengaged or when the clutch is slipping) while the engine pulls a load. The aforementioned means for reducing (this term also embraces eliminating) differences between the speeds of circulation of fluids in the first and second or further compartments can be installed only in the first compartment, only in the second or further compartment, or in each of the first and second or further compartments.

At least one of the compartments can be configurated to confine an annular layer of hydraulic fluid.

The means for reducing differences between the speeds of circulation of fluids in the first and second or further compartments can further constitute, or can be replaced by, mechanical means provided in the second or further compartment which serve to at least partially conform the speed of circulation of fluid in the further compartment to the rotational speed of the turbine while the clutch is at least partially disengaged.

Furthermore, the means for reducing the differences between the speeds of circulation of fluids in the first and second or further compartments and/or the means for at least partially conforming the speed of circulation of fluid in the further compartment to the rotational speed of the turbine can serve as, or can be utilized in addition to, mechanical means provided in the second or further compartment which serve to at least partially reduce differences which develop between the speeds of circulation of the fluids in the first and second or further compartments while the clutch is disengaged or while the clutch is slipping.

The mechanical means for reducing differences that develop between the speeds of circulation of fluids in the first and second or further compartments while the clutch is disengaged or while the clutch is slipping can be disposed between the turbine of the torque converter and the piston of the lockup clutch. Alternatively, such mechanical means can include one or more components in the first compartment and one or more components in the second or further compartment.

The aforementioned means for reducing differences between the speeds of circulation of fluids in the first and second or additional compartments and/or the aforementioned means for at least partially conforming the speed of circulation of fluid in at least one of the compartment to the rotational speed of the turbine can further constitute, or can be provided in addition to, means provided in at least one of the first and second or further compartments for influencing the fluid in the respective compartment or compartments in a sense to reduce differences between forces acting upon opposite sides of the piston in the direction of the axis which develop while the clutch is slipping and/or while the clutch is disengaged.

Another feature of the invention resides in the provision of a hydrokinetic torque converter which comprises a housing rotatable about a predetermined axis by an output element of an engine in a vehicle, which housing defines a chamber for a pressurizable hydraulic fluid that circulates in response to rotation of the output element. The housing has a wall extending at least substantially radially of the axis between a rotary turbine of the torque converter and the output element of the engine. The torque converter further comprises a lockup clutch which is disposed in the chamber of the housing and includes at least one friction disc rotatable with the housing and a piston disposed between the wall and the turbine, which piston divides the chamber into a first compartment adjacent the wall of the housing and a further compartment adjacent the turbine and being movable in the direction of the axis in response to the establishment of pressure differentials between the fluids in the first and further compartments. The clutch is at least partially engaged in response to a rise in fluid pressure in the first compartment and the resulting movement of the piston away from the wall, and the clutch is disengaged in response to a rise in fluid pressure in the further compartment because this entails a movement of the piston toward the wall. The piston urges the at least one disc against the turbine in response to a rise in fluid pressure in the first compartment. At least one of the first and further compartments confines means for reducing a difference between a higher speed of fluid circulation in the further compartment and a lower speed of circulation of fluid in the first compartment when the engine is coasting and the clutch is disengaged or slipping.

At least one of the compartments can be configurated to confine an annular layer of hydraulic fluid.

The aforementioned means for reducing differences between the speeds of circulation of fluids in the first and further compartments can further serve as, or can be utilized in addition to, means provided in the further compartment and serving to conform the speed of circulation of hydraulic fluid in the further compartment to the rotational speed of the housing when the clutch is slipping and/or when the clutch is disengaged.

The means for reducing differences that develop between the speeds of circulation of fluids in the first and further compartments when the clutch is slipping and/or when the clutch is disengaged can be installed in the further compartment. Such difference reducing means can be installed between the piston and the turbine or can include one or more parts or components in the first compartment as well as one or more parts or components in the further compartment.

Still further, at least one of the first and further compartments can accommodate means for influencing the fluid(s) in the respective compartment(s) to reduce differences between forces acting upon opposite sides of the piston in the direction of the axis which develop while the clutch is disengaged and/or while the clutch is slipping. Such influencing means can be provided in addition to, or can form part of or can constitute, the aforediscussed means for influencing the speed(s) of circulation of fluid(s) in the first compartment and/or in the further compartment for the purpose of reducing the differences between the speed of circulation of fluid in the first compartment and the speed of circulation of fluid in the further compartment when the clutch is disengaged and/or when the clutch is slipping.

A further feature of the invention resides in the provision of a hydrokinetic torque converter which comprises a housing rotatable about a predetermined axis by an output element of an engine in a vehicle and defining a chamber for a pressurizable hydraulic fluid which circulates in response to rotation of the output element. The housing has a wall which extends at least substantially radially of the axis between a rotary turbine of the torque converter and the output element of the engine. The torque converter further comprises a lockup clutch, which is disposed in the chamber between the wall and the turbine and includes at least one friction disc rotatable with the turbine or with the housing, and a piston disposed between the wall and the turbine to divide the chamber into a first compartment adjacent the turbine and a further compartment adjacent the wall. The piston is movable in the direction of the axis in response to the establishment of pressure differentials between the fluids in the first and further compartments. The clutch is at least partially engaged in response to a rise of fluid pressure in one of the first and further compartments and the resulting movement of the piston toward the wall or toward the turbine, and the clutch is disengaged in response to a rise of fluid pressure in the other of the first and further compartments entailing a movement of the piston away from the wall or from the turbine. The torque converter further includes means provided in at least one of the first and further compartments which serve to influence at least one of a plurality of different parameters including the speed of circulation of fluid in at least one of the first and further compartments and the magnitude of forces acting upon the piston in the direction of the axis while the clutch is slipping and/or while the clutch is disengaged.

The at least one friction disc can be provided with at least one friction lining and can include a portion extending substantially radially inwardly toward the axis beyond the at least one friction lining.

The turbine can include a set of vanes or blades having radially inner portions located at a lesser first distance and radially outer portions located at a greater second distance from the axis. The aforementioned portion of the at least one disc can extend substantially radially inwardly toward the axis to a location at least substantially midway between the radially inner and outer portions of the vanes or blades, e.g., to a position or location closer to the radially inner portions than to the radially outer portions of the vanes or blades.

The piston is or can constitute an annular piston made of metallic sheet material or other suitable material and having a radially inner portion located at a lesser first radial distance and a radially outer portion located at a greater second radial distance from the axis. The at least one disc can overlie at least a major part of the piston between the radially inner and outer portions of the piston (as seen in the direction of the axis).

The substantially radially inwardly extending portion of the at least one disc is or can be profiled. For example, such a portion of the at least one disc can establish one or more paths for the flow of hydraulic fluid through the at least one disc radially inwardly of the at least one friction lining.

Furthermore, the aforementioned portion of the at least one disc can be provided with at least one vane or blade radially inwardly of the at least one friction lining.

That side of the piston which confronts the turbine can be provided with profiles serving to increase the speed of circulation of hydraulic fluid about the axis when the engine is in the process of pulling a load. At least one of the profiles can resemble or constitute a blade or vane.

That side of the piston which confronts the wall of the housing can be provided with one or more profiles serving to increase the speed of circulation of hydraulic fluid about the axis when the engine is coasting. The profile or profiles can include or constitute blades or vanes.

The torque converter further comprises a pump which is adjacent to and defines with the turbine an additional fluid containing compartment. Such torque converter is preferably further provided with at least one passage for the flow of hydraulic fluid between the first compartment and the additional compartment. The at least one passage can be provided in, or radially inwardly of, a hub of the turbine.

BRIEF DESCRIPTION OF THE DRAWINGS

The novel features which are considered as characteristic of the invention are set forth in particular in the appended claims. The improved torque converter itself, however, both as to its construction and its mode of operation, together with additional features and advantages thereof, will be best understood upon perusal of the following detailed description of several presently preferred specific embodiments with reference to the accompanying drawings, wherein:

DESCRIPTION OF PREFERRED EMBODIMENTS

Figure 1:
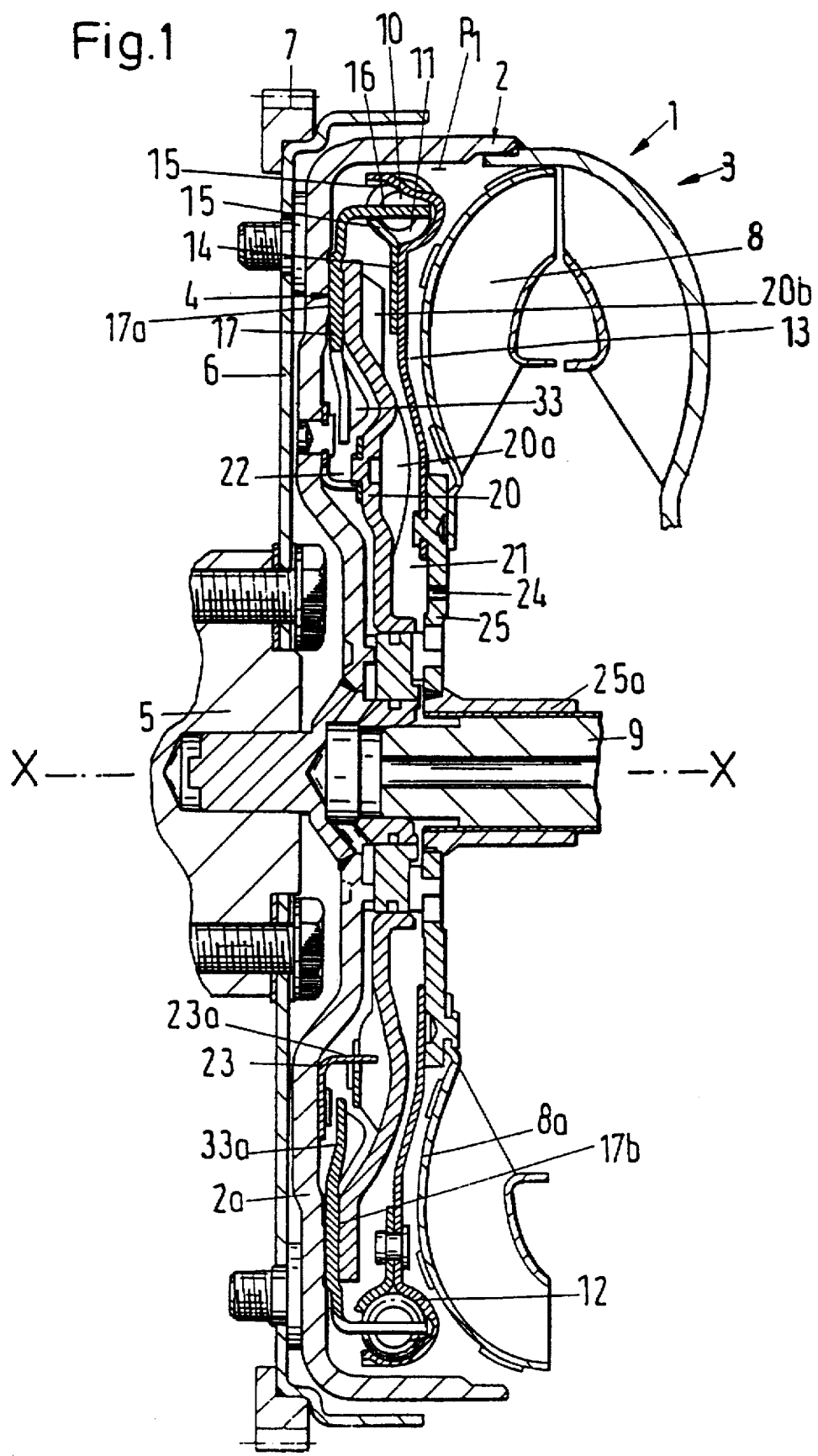
FIG. 1 is a fragmentary axial sectional view of a torque converter which embodies one form of the invention, the pump and the (optional) stator being omitted for the sake of clarity.

Referring first to FIG. 1, there is shown an apparatus 1 including a hydrokinetic torque converter 3 which is driven by an output element 5 (e.g., a camshaft or a crankshaft) of an internal combustion engine in a motor vehicle. The converter comprises a turbine 8 including a hub 25a that serves to transmit torque to one or more driven parts, not shown. The torque converter 3 further includes a housing 2 which is rotatable about an axis X—X and includes a wall 2a extending substantially radially of such axis. The housing 2 receives torque from the output element 5 by way of a disc-shaped torque transmitting element 6. The torque converter 3 further comprises a pump (not shown in FIG. 1), an optional stator (not shown in FIG. 1) and a lockup clutch or bypass clutch 4 which is confined in the chamber of the housing 2 and is installed between the substantially radially extending wall 2a and the turbine 8. The radially outer portion of the torque transmitting element 6 carries a customary starter gear 7. The latter can be mounted on the housing 2 or on the cylindrical right-hand portion of the element 6. The output element 5 is bolted or otherwise affixed to the radially inner portion of the torque transmitting element 6, and the connection between the wall 2a of the housing 2 and the torque transmitting element 6 is located radially outwardly of the output element 5.

The aforementioned pump and the optional stator of the torque converter 3 can be installed in the housing 2 in a manner as disclosed in the Copending patent application Ser. No. 08/272,920 of Otto et al. or in U.S. Pat. No. 4,993,406 granted Jan. 15, 1985 to Bopp for "Viscous Bypass Coupling For Torque Converter". The disclosure of the patent to Bopp is incorporated herein by reference. A torque converter including a turbine, a pump and a stator is also shown in the aforementioned published German patent application No. 38 23 210.

The radially inwardly extending flange 25 of the turbine 8 carries the coaxial hub 25a which is non-rotatably coupled to a shaft 9 constituting an output member of the torque from the engine converter 3. The shaft 9 can be used to transmit torque to a transmission in the motor vehicle by way of the output element 5.

When the lockup clutch 4 is engaged, it transmits torque from the wall 2a of the housing 2 to the hub 25a of the turbine 8 by way of a torsional vibration damper 10 which is installed to operate in series with the clutch 4. The latter comprises a friction disc 17 which is adjacent the inner side of the wall 2a and a pressure plate in the form of a piston 20 which is movable in the directions of the axis X—X, i.e., to the right and to the left, as viewed in FIG. 1. At least one side of the disc 17 is provided with a friction lining 17a.

In order to engage the lockup clutch 4, the piston 20 is moved in a direction to the left, as viewed in FIG. 1, to urge the friction lining 17a against the wall 2a and to engage another friction lining 17b on the other side of disc 17. When the engine drives its output element 5 while the clutch 4 is engaged, the element 5 transmits torque to the shaft 9 by way of the element 6, housing wall 2a, disc 17 and damper 10, which damper transmits torque to the flange 25 (and hence to the hub 25a) of the turbine 8. The damper 10 comprises energy storing elements 11 acting in the circumferential direction of the housing 2 to transmit torque to a disc 13 which is riveted or otherwise affixed to the flange 25 of the turbine 8. The damper 10 absorbs vibratory and/or other stray movements of the output element 5 so that such stray movements are not transmitted to the hub 25a and the shaft 9. The disc 13 resembles a circular washer and is installed between the piston 20 and the turbine 8, as seen in the direction of the axis X—X. Portions of the energy storing elements 11 (e,g., in the form of arcuate coil springs) are received in recesses or pockets 12 provided on or carried by the radially outer portion of the disc 13.

The illustrated disc 13 can be replaced by a part (not shown) which receives torque from the energy storing elements 11 of the damper 10 and transmits torque to the adjacent radially outer portion of the turbine 8, i.e., not directly to the flange 25 or to the hub 25a.

The radially inner portions of the pockets 12 are preferably located radially outwardly of or adjacent the radially outer portion of the piston 20. The pockets 12 of the disc 13 cooperate with complementary pockets provided on a washer-like member 14 riveted to the radially outer portion of the disc 13. The connection between the disc 13 and the member 14 is established radially inwardly of the energy storing elements 11 forming part of the damper 10. The pockets 12 of the disc 13 cooperate with the pockets of the member 14 to ensure that the arcuate energy storing elements 11 of the damper 10 remain in the illustrated positions radially outwardly of the piston 20. The pockets of the member 14 and/or the pockets 12 of the disc 13 are provided with abutments 15 which are adjacent the end convolutions of the energy storing elements 11. These energy storing elements are compelled to orbit about the axis X—X when the element 5 is driven by the engine and the clutch 4 is engaged because the disc 17 is provided with axially parallel legs 16 which engage the neighboring end convolutions of the elements 11. The legs 16 can be made of one piece with the radially outer portion of the disc 17 or they can constitute separately produced parts which are welded or otherwise affixed to the radially outer portion of the disc 17.

The piston 20 is non-rotatably but axially movably coupled to the housing 2. This piston divides the internal chamber of the housing 2 into a first compartment 21 which is adjacent the turbine 8 and a second compartment 22 which is adjacent the wall 2a. The illustrated piston 20 is a substantially circular disc-shaped part which is installed between the turbine 8 and the friction disc 17. The compartment 21 contains the disc 13 and the energy storing elements 11 of the damper 10. The compartment 22 is sealed from the compartment 21 when the clutch 4 is engaged, i.e., when the left-hand friction lining 17a bears against the adjacent inner side of the wall 2a and the right-hand lining 17b is engaged by the adjacent side of the piston 20.

Axial movements of the piston 20 in directions to engage or disengage the clutch 4 take place in response to the establishment of differentials between the pressures of hydraulic fluids which fill the compartments 21 and 22. The manner in which the pressure of fluids in the compartments 21, 22 can be regulated by a control unit (not shown) is known and forms no part of the present invention. It suffices to say that the piston 20 is caused to urge the friction disc 17 against the wall 2a (to thus engage the lockup clutch 4) when the pressure of fluid in the compartment 21 exceeds the pressure of fluid in the compartment 22, and that the clutch 4 is disengaged in response to a rise of fluid pressure in the compartment 22 so that the piston 20 is caused to move axially away from the wall 2a.

The pressure of hydraulic fluid in the compartment 21 can be regulated by the aforementioned control unit in such a way that the piston 20 can be maintained in one or more axial positions in which the clutch 4 is only partially engaged, i.e., the clutch 4 is then operated with a selected slip in that the friction linings 17a, 17b of the disc 17 can slide relative to the wall 2a and the piston 20 to a selected extent. Analogously, the pressure of fluid in the compartment 22 can also be regulated in such a way that it suffices to prevent full engagement of the clutch 4 but enables the friction disc 17 to slip, to a desired extent, relative to the wall 2a and the piston 20.

The means for non-rotatably coupling the piston 20 to the housing 2 with freedom of movement in the direction of the axis X—X includes a washer-like annular member 23 which is affixed (e.g., riveted or welded) to the inner side of the wall 2a radially inwardly of the adjacent friction lining 17a and includes axially parallel male detents or holders 23a extending into complementary female detents or sockets of the piston 20. It is also possible to mount the holders 23a or analogous male detents of the member 23 in such a way that they engage complementary projections or protuberances (such as or analogous to those shown at 20a), as long as the cooperating detents of the member 23 and the piston 20 function in a manner to prevent the piston 20 from rotating relative to the housing 2 but ensure that the piston 20 can be moved axially toward and away from the wall 2a. Thus, the piston 20 always rotates at the speed of the housing 2 and its wall 2a, and the friction disc 17 rotates at the speed of the turbine 8.

The compartments 21, 22 at the opposite sides of the piston 20 are at least substantially hydraulically sealed from each other by the piston 20 when the lockup clutch 4 is caused to operate with slip.

When the clutch 4 is disengaged, the pressure of hydraulic fluid in the compartment 22 exceeds the pressure of fluid in the compartment 21. The radial pressure profile in the compartment 22, which is defined by the pressure Pl generated by the pump of the torque converter 3, decreases radially inwardly along the left-hand side of the piston. The reduction of pressure in a direction radially inwardly from the cylindrical radially outer portion of the housing 2, along the left-hand side of the piston 20 and toward the axis X—X is determined by the portions of hydraulic fluid which form or resemble a layer in the compartment 22. Thus, a drop of fluid pressure in the compartment 22 in a direction radially inwardly toward the axis X—X is less pronounced when the fluid in the compartnnent 22 is caused to circulate at a relatively low speed but increases in response to increasing speed of the layer of hydraulic fluid which circulates in the compartment 22 about the axis X—X. This can be explained as follows:

If one assumes that only the fluid particles in the compartment 22 are at a standstill while the output element 5 of the engine drives the housing 2, there would be no pressure drop in a direction radially inwardly from the radially outer portion of the housing 2 (where the pressure equals Pl), within the compartment 22 and toward the axis X—X. In other words, the pressure of the fluid in the radially inner portion of the compartment 22 would also equal Pl. When the particles of fluid in the compartment 22 circulate about the axis X—X, the axial force acting in the compartment 22 upon the left-hand side of the piston 20, being the resultant of the pressure field in the compartment 22, can be increased when the clutch 4 is disengaged and the vehicle is in the process of pulling a load, by the expedient of reducing or lowering the speed of circulatory movement of fluid particles in the compartment 22. In the apparatus of FIG. 1, this is accomplished by the provision of one or more vanes, blades or wings 33 which are carried by the friction disc 17 and thus rotate at the speed of the turbine 8. When the vehicle is in the process of pulling a load, the rotational speed of the turbine 8 is less than the rotational speed of the housing 2 and piston 20.

The just-discussed dynamic and kinematic relationships regarding the distribution of fluid pressures in the compartment 21 are also valid for the distribution of fluid pressures in the compartment 21 between the piston 20 and the turbine 8. Accordingly, and if the aforementioned fluid pressure influencing means 33 were omitted, the lockup clutch 4 would become engaged in a fully automatic way when the vehicle is in the process of pulling a load. Such engagement or closing of the clutch 4 is undesirable and is particularly likely to take place when the quantity of fluid which is available to engage or disengage the lockup clutch 4 (and which is furnished by an externally mounted discrete pump) is so small that the pressure differential adapted to be established between the compartments 21, 22 by the fluid which is furnished by the discrete pump is less than that pressure differential at the opposite sides of the piston 20 which is established by the fluid layers in the compartments 21 and 22 as a result of the aforediscussed fluid pressure drop in a direction from the radially outer portion of the housing 2 toward the axis X—X. Thus, the lockup clutch 4 would become engaged at an inopportune time. In other words, the pressure differentials which develop as a result of the circulation of bodies of fluid in the compartments 21, 22 at opposite sides of the piston 20 could adversely influence the operation of the lockup clutch 4 because the clutch would be automatically engaged at an inopportune time.

Such undesirable operation of the lockup clutch 4 is prevented by the simple expedient of employing a friction disc 17 having one or more portions 33a extending radially inwardly toward the axis X—X beyond the friction linings 17a, 17b and carrying one or more projections 33 which can resemble or constitute vanes or blades, e.g., vanes or blades of the type known from the art of propellers and blowers. Since the disc 17 rotates at the speed of the turbine 8, such speed is less than that of the piston 20 and housing 2 when the vehicle is pulling a load and the clutch 4 is disengaged or partially disengaged (slipping). This, in turn, ensures that the particles of the (normally viscous) fluid in the compartment 22 (which is bounded in part by the more rapidly rotating housing wall 2a and in part by the piston 20 which rotates at the speed of the housing 2) tend to circulate at a higher average speed than the particles of the body of fluid in the compartment 21. However, the speed of circulation of the fluid particles in the compartment 22 is reduced by the projection or projections 33 of the friction disc 17 which rotates at the lower speed of the turbine 8. Thus, the interaction between the body of fluid in the compartment 22 and the projection or projections 33 is such that the speed of circulation of the body of fluid in the compartment 22 is reduced. The average speed of circulation of fluid in the compartment 22 when the vehicle is in the process of pulling a load is less than if the projection or projections 33 of the friction disc 17 were omitted, i.e., if the speed of circulation of fluid in the compartment 22 were determined solely by the rapidly rotating housing 2 and its wall 2a and by the equally rapidly rotating piston 20. The influence of the projection or projections 33 upon the speed of circulation of fluid in the compartment 22 is or can be so pronounced that, when the clutch 4 is disengaged or when this clutch is slipping, the difference between the fluid pressures in the compartments 21 and 22 is conducive to more predictable and more readily controllable engagement, disengagement and partial disengagement (slippage) of the lockup clutch 4.

Similar results can be obtained by providing the radially inwardly extending portion or portions 33a of the friction disc 17 with surfaces or formations which establish a more pronounced frictional engagement between the portion or portions 33a on the one hand and the fluid in the compartment 22 on the other hand. Furthermore, the projection(s) 33 and/or the friction generating surface or surfaces of the portion or portions 33a can be utilized jointly with or can be replaced by holes or recesses in the portion or portions 33a; such recesses or holes also reduce the average speed of circulation of fluid in the compartment 22 when the vehicle embodying the apparatus 1 is in the process of pulling a load. This imparts to the friction disc 17 a tendency to reduce the pressure of the fluid in the compartment 22 when the lockup clutch 4 is partially engaged (slipping) and to increase the fluid pressure in the compartment 22 when the clutch is disengaged.

As already mentioned above, the piston 20 is free to move in the direction of the axis X—X (either toward or away from the wall 2a) and the piston rotates at the speed of the housing 2, namely at a speed which is higher than the speed of the friction disc 17, when the clutch 4 is disengaged or partially engaged (slipping) while the vehicle is in the process of pulling a load. In order to ensure that the opposite sides of the piston 20 are subjected to the action of fluid-generated forces which at least substantially balance each other, at least while the lockup clutch 4 is disengaged or partially engaged (such forces are generated by the substantially layer-like annular bodies of fluid in the compartments 21 and 22), it is possible to resort to the aforementioned projection or projections 33 (and/or to the aforementioned equivalents of such projection or projections) in the compartment 22 as well as to influence the speed of circulation of fluid in the compartment 21. For example, such influencing can be effected by the portion(s) 20a and/or 20b which form part of the piston 20 and extend into the compartment 21 to increase the speed of circulation of hydraulic fluid in the compartment 21 when the vehicle is in the process of pulling a load and to reduce the speed of circulation of fluid in the compartment 21 when the vehicle is coasting. The portion or portions 20a and/or 20b can be of one piece with the major portion of the piston 20 or they can constitute separately produced parts which are affixed (e.g., welded) to the piston. The portion or portions 20a, 20b (and/or their equivalents) enhance the interaction between the piston 20 and the body of hydraulic fluid in the compartment 21. At least some of the portions 20a, 20b can extend into the compartment 21 in a direction which is parallel to the axis X—X. Depending upon the mode of operation of the torque converter 3 during certain stages of operation of the vehicle which embodies the apparatus 1, the projection(s) 20a and/or 20b will tend to increase or to reduce the speed of circulation of hydraulic fluid in the compartment, always for the purpose of reducing the difference between the pressures of fluid layers confined in the compartments 21, 22 and acting upon the respective sides of the piston 20 in directions parallel to the axis X—X. This, in turn, facilitates the task of the control system which is used to change the condition of the lockup clutch from a disengaged to a partly engaged and fully engaged condition or in the opposite direction.

When the lockup clutch 4 is partly engaged, i.e., when its friction disc 17 can slip relative to the wall 2a and piston 20, the compartments 21 and 22 are practically sealed from each other and the pressure of fluid in the compartment 22 is not influenced by the pressure PI of fluid in the radially outermost portion of the chamber of the housing 2 and/or by a tendency of the fluid in the compartment 21 to reduce its speed of circulation starting at the radially outermost part of the compartment 22 and proceeding toward the axis X—X. At such time (and when the vehicle is in the process of pulling a load), the portion or portions 33 (and/or their equivalent(s) in the compartment 22) tend to reduce the peripheral speed of the body of fluid in the compartment 22 and to thus reduce the magnitude of the force which the fluid in the compartment 22 applies to the respective side of the piston 20. This, in turn, ensures that the partially disengaged (slipping) clutch 4 does not tend to become fully disengaged while the vehicle is called upon to pull a load.

To summarize, the means (20a, 20b) for controlling the speed of circulation and the pressure of the fluid in the compartment 21 and/or the means (33, 33a) for controlling the speed of circulation and the pressure of the fluid in the compartment 22 serve to reduce the differences between the speeds of circulation of fluid bodies in the compartments 21, 22 when the clutch 4 is partially disengaged (slipping) while the vehicle is coasting and/or while the vehicle is called upon to pull a load. In the absence of such an undertaking or undertakings, the speed of circulation of the fluid in the compartment 22 would exceed the speed of circulation of the fluid in the compartment 21 because the compartment 22 is bounded by the wall 2a of the housing 2 which is driven by the output element 5 of the engine as well as by the piston 20 which rotates at the speed of the wall 2, whereas the speed of circulation of the fluid in the compartment 21 is determined in part by the turbine 8 whose speed is or can be less than the speed of the housing 2 and piston 20.

When the vehicle is in the process of pulling a load, the torque converter 3 operates in such a way that the output element 5 of the engine drives the housing 2 by way of the torque transmitting element 6. The housing 2 transmits torque to the shaft 9 by way of the lockup clutch 4 and damper 10 or by way of the pump (not shown), the turbine 8 and the stator (not shown). In either event, the hub 25a of the turbine 8 transmits torque to the shaft 9 which, in turn, transmits torque to the transmission (not shown) in the motor vehicle.

When the vehicle is coasting, the aforementioned transmission transmits torque to the shaft 9 which, in turn, drives the output element 5 of the engine through the medium of the partly or fully engaged lockup clutch 4 and/or by way of the stator, turbine 8 and pump of the torque converter 3. In other words, the vehicle is coasting when the operator can remove her or his foot from the gas pedal so that the wheels of the motor vehicle drive the transmission which drives the shaft 9 and the output element 5 by way of the partially or fully engaged lockup clutch 4 and/or by way of the stator, turbine 8 and pump of the torque converter 3.

The portion(s) 33a and the projection(s) 33 of the friction disc 17 can be said to constitute mechanical means for conforming the speed of circulation of the fluid in the compartment 22 to the speed of rotation of the turbine 8 when the lockup clutch 4 is disengaged or partially disengaged (slipping) and at least while the vehicle is in the process of pulling a load. Furthermore, the portion(s) 33a and the projection(s) 33 can be said to constitute mechanical means for reducing the difference between the speeds of circulation of layer-like bodies of hydraulic fluid in the compartments 21 and 22 while the vehicle pulls a load and the lockup clutch 4 is disengaged or partially disengaged (slipping).

The projection or projections 20a and/or 20b in the compartment 21 can be said to constitute mechanical means also serving to reduce the differences between the speeds of circulation of bodies of fluid in the compartments 21 and 22 when the lockup clutch 4 is disengaged or partially disengaged and while the vehicle is in the process of pulling a load. As mentioned above, the projection or projections 20a and/or 20b can be utilized in addition to or in lieu of the portion(s) 33a and/or projection(s) 33 and/or their equivalents or vice versa. The projection(s) 20a and/or 20b serve to increase the speed of circulation of fluid in the compartment 21 adjacent to the relatively slowly rotating turbine 8, whereas the portion(s) 33a and/or projection(s) 33 (and/or their aforediscussed equivalents) serve to reduce the speed of circulation of fluid in the compartment 22, i.e., in the compartment which is bounded by the rapidly rotating housing 2 and equally rapidly rotating piston 20. Such accelerating actions of the projection or projections in the compartment 21 and decelerating actions of the projections in the compartment 22 are effective at least while the lockup clutch 4 is at least partially disengaged and while the vehicle pulls a load. Furthermore, and as already mentioned above, the projection(s)in the compartment 21 and/or in the compartment 22 can serve as a means for balancing or equalizing the forces acting upon the respective sides of the piston 20 in the direction of the axis X—X when the clutch 4 is at least partially disengaged and while the vehicle is in the process of pulling a load. The balancing or equalizing action is or can be such that the axial forces which the fluid in the compartment 21 applies to the right-hand side of the piston 20 match or at least closely approximate the axial forces which the fluid in the compartment 22 applies to the left-hand side of the piston 20.

Figure 2:
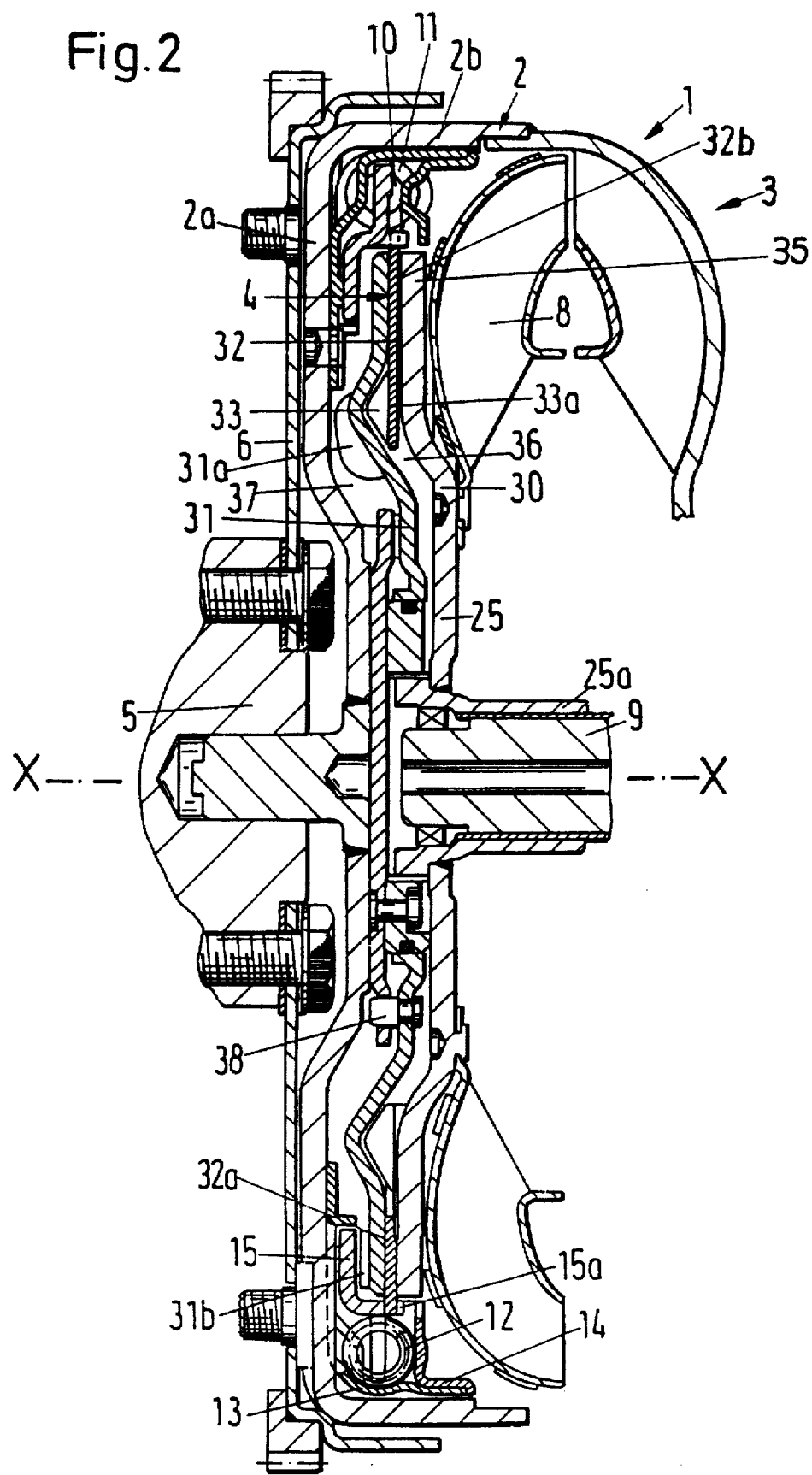
FIG. 2 is a similar fragmentary axial sectional view of a modified torque converter.

FIG. 2 shows a portion of a second apparatus 1 including a modified torque converter 3 which embodies a modified lockup clutch or bypass clutch 4. Those parts of the apparatus 1 of FIG. 2 which are identical with or clearly analogous to the corresponding parts of the apparatus 1 of FIG. 1 are denoted by similar reference characters. The lockup clutch 4 of FIG. 2 is installed in the chamber of the housing 2 forming part of the torque converter 3 and including a wall 2a extending substantially radially of the axis X—X between the clutch 4 and the output element 5 of an engine in a motor vehicle. The clutch 4 is installed between the wall 2a and the turbine 8 of the torque converter 3 and includes an axially movable pressure plate or piston 31 and a friction disc 32 disposed between the piston 31 and the turbine 8. The disc 32 is disposed in a first compartment 36 at one side of the piston 31 and the latter cooperates with the wall 2a to define a second compartment 37 which is sealed (by the piston 31) from the compartment 36 when the clutch 4 is engaged or partially engaged (slipping). The turbine 8 of the torque converter 3 includes a radially inwardly extending flange 25 which is of one piece with or is welded or otherwise non-rotatably connected to a hub 25a non-rotatably surrounding a portion of a shaft 9 serving to transmit torque to or from a transmission (not shown), depending upon whether the vehicle embodying the apparatus 1 of FIG. 2 is in the process of pulling a load or is coasting.

When the lockup clutch 4 is engaged, it transmits torque directly between the housing 2 and the hub 25a of the turbine 8 because the friction linings 32a of the disc 32 are then clamped between the adjacent side of the piston 31 and a radially extending plate-like member 35 which is riveted and/or otherwise affixed to the flange 25, hub 25a and/or another part of the turbine. Actually, the engaged lockup clutch 4 of FIG. 2 transmits torque to or from the shaft 9 by way of a damper 10 which is or can be identical with or analogous to the damper 10 in the torque converter of FIG. 1.

The damper 10 is installed in series with the lockup clutch 4. When the output element 5 of the engine drives the housing 2 by way of the torque transmitting member 6, the housing drives two discs 13, 14 which, in turn, transmit torque to the damper 10. The energy storing elements 11 of the damper 10 transmit torque to a disc-shaped carrier 15 for the friction disc 32. The disc 32 transmits torque to the torque converter 3, i.e., to the hub 25a of the turbine 8 which cooperates with a pump (not shown) and (if necessary) with a stator (not shown)in a manner as described and shown in the aforediscussed references such as the patent to Bopp.

The discs 13, 14 are provided with pockets 12 for the energy storing elements (such as arcuate coil springs) 11 of the damper 10. The radially outermost tubular or cylindrical portion 2b of the housing 2 surrounds and is welded to or otherwise non-rotatably connected with the discs 13 and 14. The pockets 12 of the discs 13, 14 are configured and located in such a way that the energy storing elements 11 of the damper 10 are disposed radially outwardly of the friction linings 32a forming part of the friction disc 32 and radially outwardly of the piston 31. Otherwise stated, the inner radii of curvature of the pockets 12 at least match but can exceed the radii of the radially outer portions of the friction linings 32a.

The washer-like discs 13, 14 and the washer-like member 15 cooperate to stress the energy storing elements 11 when the turbine 8 is driven by the output element 5 of the engine. To this end, the member 15 is provided with axially parallel legs 15a which further serve to fix the friction disc 32 against movement radially of the axis X—X as well as to transmit torque between the disc 32 and the member 15. The illustrated disc 32 resembles a substantially flat washer with friction lining 32a, 32b formed on or affixed to its two sides. When the lockup clutch 4 of FIG. 2 is engaged, the friction lining 32a is engaged by the right-hand side of the piston 31 and the friction lining 32b is pressed against the member 35, i.e., against a portion of the turbine 8. The friction disc 32 cannot rotate but can perform limited axial movements relative to the member 15. The member 35 includes a radially inwardly extending portion 30 which constitutes or includes or is non-rotatably connected to the radially extending flange 25 of the turbine 8.

The compartments 36, 37 are connectable by conduits (not shown) to the control unit (not shown) serving to engage, to partially disengage or to disengage the lockup clutch 4. Each of these compartments is filled with a pressurizable hydraulic fluid, e.g., a viscous or highly viscous fluid. When the fluid pressure in the compartment 37 exceeds the fluid pressure in the compartment 36, the piston 31 is shifted in the direction of the axis X—X toward the turbine 8 to thus engage the lockup clutch 4. Inversely, the piston 31 is caused to move toward the wall 2a when the pressure of fluid in the compartment 36 exceeds the pressure of fluid in the compartment 37; this entails a disengagement of the lockup clutch 4.

The radially inner portion of the piston 31 is non-rotatably connected to the hub 25a of the turbine 8 by a coupling 38 which permits the piston to move axially toward or away from the turbine 8. In other words, the rotational speed of the piston 31 about the axis X—X always matches the rotational speed of the turbine 8 and its hub 25a. On the other hand, the friction disc 32 always rotates at the speed of the output element 5 of the engine because it is non-rotatably connected to the housing 2 which, in turn, is non-rotatably connected to the output element 5 by the substantially disc-shaped torque transmitting member 6. In other words, the rotational speed of the piston 31 departs or can depart from the rotational speed of the friction disc 32 when the lockup clutch 4 is disengaged or partially disengaged (slipping).

When the vehicle is coasting and the lockup clutch 4 is disengaged or partially disengaged, the speed of rotation of the turbine 8 (which is driven by the shaft 9) exceeds the rotational speed of the housing 2. In the absence of any undertakings to the contrary, the speed of circulation of fluid in the compartment 36 would considerably depart from the speed of circulation of fluid in the compartment 37. Thus, the speed of circulation of fluid in the compartment 36 would exceed the speed of circulation of fluid in the compartment 37 because the compartment 36 is bounded by the turbine 8 and the piston 31, i.e., by two components whose rotational speed exceeds the speed of rotation of the housing 2 when the engine is coasting. The fluid pressure in the compartment 36 (as compared with fluid pressure in the compartment 37) decreases when the lockup clutch 4 is disengaged, and this creates problems in connection with the engagement of the clutch 4 since a pressure differential between the fluids in the compartments 36, 37 already exists before the control system is set to reengage the lockup clutch. The problems are particularly acute when the control system for the torque converter 3 is designed to engage the lockup clutch 4 in response to the establishment of a relatively small pressure differential between the bodies of fluid in the compartments 36 and 37. In other words, the pressure differential which can be established by the control system for the purposes of reengaging the clutch might not be sufficient to invariably ensure the engagement of the clutch when such engagement is desired or necessary.

In accordance with a feature of the invention, the friction disc 32 extends radially inwardly beyond the friction linings 32a, 32b, and such radially inwardly extending portion or portions 33a carry profiles 33, e.g., in the form of vanes or blades which are located in the compartment 36 of the chamber within the housing 2. When the vehicle is coasting, the rotational speed of the friction disc 32 (which shares the angular movements of the housing 2) is less than that of the turbine 8 and the piston 31 (the latter rotates with the turbine). However, since the profiles 33 rotate at the speed of the friction disc 32, i.e., at a speed less than that of the piston 31 and member 35 (the parts 31 and 35 are disposed at opposite sides of the compartment 36), the profiles 33 reduce the speed of circulation of viscous fluid in the compartment 36, i.e., the difference between the pressures of fluid bodies in the compartments 36 and 37 is reduced due to the provision of the profiles 33 because the profiles 33 exert a decelerating action upon the fluid in the compartment 36. Consequently, the average speed of circulation of fluid in the compartment 36 is reduced by the profiles 33 when the vehicle is coasting, i.e., when the speed of the turbine 8 and piston 31 exceeds the speed of the housing 2 and friction disc 31. Furthermore, it is necessary to only slightly increase the pressure of fluid in the compartment 36 when the lockup clutch 4 is to be disengaged and/or maintained in the disengaged condition while the vehicle is coasting so that the turbine 8 drives the housing 2 and the output element 5 of the engine. Stated otherwise, a relatively low pressure of fluid in the compartment 36 suffices to maintain the lockup clutch 4 in disengaged condition while the vehicle is coasting.

If the vehicle is used to pull a load and the lockup clutch 4 is disengaged, and if the profiles 33 are omitted, the fluid in the compartment 36 causes the generation of a force which acts upon the right-hand side of the piston 31 in the direction of the axis X—X, i.e., toward the wall 2a of the housing 2. In other words, the fluid in the compartment 36 then tends to disengage the lockup clutch 4. At such time (i.e., when the output element 5 transmits torque to the housing 2), the rotational speed of the housing 2 and the friction disc 32 exceeds the rotational speed of the piston 31 and turbine 8. The pressure of the fluid in the compartment 36 (as seen in a direction from the radially outer portion 2b of the housing 2 toward the axis X—X) is then less pronounced than in the compartment 37. Thus, the pressure level in the compartment 36 is higher. This entails the development of a resultant force acting upon the piston 31 in a direction from the turbine 8 toward the wall 2a, i.e., in a direction to disengage the lockup clutch 4. If the clutch 4 is to be reengaged, the pressure of fluid in the compartment 37 must be increased by the aforementioned discrete pump in order to reliably overcome the elevated pressure of the fluid in the compartment 36. This can be accomplished by employing a relatively large discrete fluid pump whose energy and space requirements are undesirably large when such a pump is used in a motor vehicle. In the absence of a pump which can reliably raise the fluid pressure in the compartment 37 to a value sufficient to invariably engage the clutch 4, the clutch would remain in the disengaged condition.

The situation is entirely different if the apparatus 1 is constructed in a manner as shown in FIG. 2, i.e., if the friction disc 32 is provided with one or more radially inwardly extending portions 33a for blades, vanes and/or analogous profiles 33. Such profiles raise the speed of circulation of the fluid in the compartment 36 because the disc 32 rotates with the housing 2 and the speed of the housing exceeds the speed of the piston 31 and turbine 8 because the vehicle is in the process of pulling a load, i.e., the output element 5 of the engine drives the housing 2. As the profiles 33 accelerate the fluid in the compartment 36, the pressure of the fluid in the compartment 36 (when the clutch 4 is disengaged) decreases. This reduces the magnitude of forces acting upon the right-hand side of the piston 31 in a direction (toward the wall 2a) to disengage the lockup clutch 4. It is even possible to reduce the magnitude of such force to zero. Irrespective of whether the pressure of the fluid in the compartment 36 is merely reduced or drops to zero, the provision of profiles 33 in the compartment 36 ensures that the lockup clutch 4 can be reengaged in response to a small or relatively small rise of fluid pressure in the compartment 37.

If the profiles 33 were omitted and the apparatus 1 of FIG. 2 were operated in such a way that the vehicle is coasting, the torque converter 3 would cause the lockup clutch 4 to become automatically engaged. As already explained above, the provision of profiles 33 on the radially inner portion or portions 33a of the friction disc 32 at least reduces the tendency of the lockup clutch 4 to become automatically engaged when the vehicle is coasting.

The vane- or blade-like profiles 33 on the radially inwardly extending portion or portions 33a of the friction disc 32 can be used with or can be replaced by other means for influencing the fluid in the compartment 36. For example, the portion or portions 33a can be provided with means for increasing friction between the disc 32 and the viscous fluid in the compartment 36. Furthermore, it is possible to use the profiles 33 and/or the friction generating means with or in lieu of recesses (not specifically shown) in the portion or portions 33a. All that counts is to provide the disc 32 with one or more means or sets of means for ensuring that the average speed of circulation of fluid in the compartment 36 is reduced when the vehicle is coasting and that the pressure of the fluid in the compartment rises when the lockup clutch 4 is disengaged.

It is equally within the purview of the invention to influence the fluid in the compartment 37 in a sense to reduce the pressure differential between the hydraulic fluids which fill the compartments 36 and 37. The means for influencing the fluid in the compartment 37 can be utilized with or in lieu of the aforedescribed means (such as the profiles 33) in the compartment 36. FIG. 2 shows that the piston 31 is provided with profiles 31a, 31b which can constitute vanes or blades and extend into the compartment 37. Such profiles can constitute separately produced parts which are welded or otherwise secured to the substantially disc-shaped main body portion of the piston 31. This main body portion can be made (e.g., stamped) from suitable metallic sheet material.

The profiles 31a, 31b tend to accelerate the fluid in the compartment 37 when the vehicle is coasting; such an acceleration of the fluid in the compartment 37 (due to a more pronounced interaction between the piston 31 and the fluid in the compartment 37) entails a change (namely a reduction) of the pressure differential between the fluids in the compartments 36, 37. This, in turn, ensures that the condition of the lockup clutch 4 can be changed in response to a relatively small rise of fluid pressure in the compartment 36 or 37, depending upon whether the lockup clutch is to be engaged, partially engaged or disengaged.

Referring again to FIG. 1, the flange 25 of the turbine 8 is provided with one or more holes 24 which establish one or more passages between the compartment 21 and a compartment (not specifically shown in FIG. 1) which is disposed between the turbine 8 and the pump of the torque converter 3, and constitutes a third portion of the internal chamber of the housing 2. The hole or holes 24 are provided in the flange 25 radially inwardly of the profile or profiles 20a of the piston 20. The hole or holes 24 can be provided in addition to or in lieu of one or more holes provided in, or radially inwardly of, the hub 25a of the turbine 8 and serve the same purpose as the illustrated hole(s), i.e., to establish one or more paths or passages for the flow of hydraulic fluid between the compartment 21 and the compartment (not shown) between the turbine 8 and the non-illustrated pump of the torque converter 3 shown in FIG. 1. The purpose of the hole or holes 24 and/or their equivalents is to reduce the difference between the pressure of the fluid in the compartment 21 and the compartment between the pump and the turbine 8.

The profiles 33 of the friction discs 17 and 32 share the advantage that they bring about an at least substantial identity between the speed of circulation of fluid particles in the compartment 22 or 36 on the one hand and the compartment 21 or 37 on the other hand. Moreover, the profiles 33 ensure that the distribution of fluid pressures in the compartment 21 (or 36) at least approximates the distribution of fluid pressures in the compartment 22 (or 37), and this holds true irrespective of whether the engine is coasting or is in the process of pulling a load. Otherwise stated, the profiles 33 can ensure that, under ideal circumstances, the pressure of fluid in the compartment 21 or 36 actually matches the pressure of fluid in the compartment 22 or 37, i.e., that a relatively small rise of pressure in one of the compartments 21, 22 or 36, 37 (such rise of pressure is effected by the aforediscussed discrete pump) suffices to change the condition of the lockup clutch from engaged to partially disengaged to fully disengaged or in the opposite direction.

The portion or portions 33a of the friction disc 17 or 32 can extend radially inwardly toward the respective axis X—X at least to a location substantially midway between the radially innermost and the radially outermost portions of the vanes or blades 8a forming part of turbine 8. In FIGS. 1 and 2, the portions 33a extend radially inwardly to positions closer to the radially innermost portions than to the radially outermost portions of the vanes forming part of the turbine 8. In either event, the portion or portions 33a of the disc 17 extend radially inwardly beyond the friction surfaces 17a and the portion or portions 33a of the disc 32 also extend radially inwardly well beyond the radially inner portions of the friction linings 32a and 32b.

It is often desirable and advantageous to select the dimensions of the friction disc 17 or 32 (inclusive of its radially inwardly extending portion or portions 33a) in such a way that the disc or its radially inwardly extending portion overlies the entire piston 20 or 31, as seen in the direction of the respective axis X—X.

An important advantage of the improved torque converter 3 is that the pressure of the circulating fluid in the compartment 21 or 36 matches or at least rather closely approximates the pressure of the fluid in the compartment 22 or 37, irrespective of whether the vehicle is coasting or is called upon to pull a load. In other words, small or extremely small variations of fluid pressure in the compartment 21 or 22 (FIG. 1) or 36 or 37 (FIG. 2) suffice to change the condition of the lockup clutch 4. The reason is that the lockup clutch 4 is prevented from generating a moment of friction not only when the engine is coasting, but also when the vehicle is in the process of pulling a load. This is accomplished by resorting to the aforediscussed expedient of ensuring that the axial forces acting upon the opposite sides of the piston 20 or 31 are at least substantially balanced due to the provision of the aforediscussed profiles 33, 20a, 20b, 31a, 31b and/or analogous expedients. Under ideal circumstances, the forces acting upon opposite sides of the piston 20 or 32 neutralize each other so that axial displacements of the piston 20 or 31 toward or away from the wall 2a of the respective housing can be achieved by slightly increasing the fluid pressure in the compartment 21 or 22 (FIG. 1) or in the compartment 36 or 37 (FIG. 2). For example, a relatively small rise of fluid pressure in the compartment 21 of FIG. 1 is necessary to reengage the respective lockup clutch 4, and a relatively small rise of fluid pressure in the compartment 37 of FIG. 2 is necessary to reengage the respective lockup clutch 4. This holds true irrespective of whether the vehicle is coasting or pulling a load. Furthermore, a relatively small rise of fluid pressure in the compartment 22 of FIG. 1 or in the compartment 36 of FIG. 2 is necessary to disengage the respective clutch 4. Such features of the improved torque converter 3 render it possible to employ a relatively small discrete pump which causes the fluid pressure in the compartment 21 or 22 of FIG. 1 or in the compartment 36 or 37 of FIG. 2 to rise in order to change the condition of the respective lockup clutch 4.

Another important advantage of the improved torque converter is that it contributes to the comfort of the occupant or occupants of the vehicle which employs the apparatus 1 of FIG. 1 or 2 or an analogous apparatus. The reason is that the transitions between different operating conditions of the lockup clutch 4 (from engaged to partially disengaged to fully disengaged or in the opposite direction) are smooth because even minor changes of fluid pressure in the compartment 21 or 22 of FIG. 1 or the compartment 36 or 37 of FIG. 2 suffice to effect a reliable and predictable change of the operating condition of the lockup clutch.

The improved apparatus are susceptible of numerous additional modifications without departing from the spirit of the invention. For example, several features of the apparatus 1 of FIG. 2 can be incorporated in the apparatus 1 of FIG. 2 and/or the other way around. Furthermore, it is believed that numerous auxiliary features of the torque converter 3 of FIG. 1 and/or of the torque converter of FIG. 2 are sufficiently novel and unobvious to merit patent protection regardless of the exact nature of the torque converter which embodies such features. This applies, for example, to the construction and/or configuration and/or dimensioning of the piston 20 or 31 and/or friction disc 17 or 32. Moreover, the number of friction discs can be increased and the number of friction linings on each friction disc can be reduced, depending upon the intended use of the improved torque converter and its lockup clutch.

Additional important advantages of the improved apparatus are their compactness and simplicity. Thus, by the simple expedient of altering the configuration of that portion or those portions of the piston 20 or 31 which extends or extend into the adjacent compartment 21 or 37, and/or of altering the configuration of that portion or those portions of the friction disc 17 or 32 which is or which are adjacent the compartment 22 or 36, one can ensure that the changes in the condition of the lockup clutch 4 or an equivalent lockup or bypass clutch can be completed with a higher degree of reliability and predictability, and in response to the application of lesser forces than in heretofore known torque converters.

The apparatus of the present invention can be incorporated in heretofore known types of motor vehicles to replace conventional torque transmitting apparatus employing a hydrokinetic torque converter between the output element of a prime mover and the input element of a transmission or another unit or assembly in the power train between the prime mover and the wheels and/or other driven parts of the vehicle.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending at least substantially radially of said axis between a rotary turbine of the torque converter and said output element; a lockup clutch disposed in said chamber between said wall and said turbine and including at least one friction disc rotatable with said turbine and a piston disposed between said wall and said turbine, said at least one friction disc being rotatable relative to said piston and said piston dividing said chamber into a first compartment adjacent said turbine and a second compartment adjacent said wall, said piston being movable in the direction of said axis in response to the establishment of pressure differentials between the fluids in said compartments, said clutch being at least partially engaged in response to a rise of fluid pressure in said first compartment and being disengaged in response to a rise of fluid pressure in said seccond compartment; and means for reducing differences developing between a lower speed of circuation of fluid in said first compartment and a higher speed of circulation of fluid in said second compartment when the clutch is at least partially disengaged while the engine pulls a load, said difference reducing means being disposed in at least one of said compartments.

2. The torque converter of claim 1, wherein at least one of said compartments is configurated to confine an annular layer of hydraulic fluid.

3. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and said output element; a lockup clutch disposed in said chamber between said wall and said turbine and including at least one friction disc rotatable with said turbine and a piston disposed between said wall and said turbine, said at least one friction disc being rotatable relative to said piston and said piston dividing said chamber into a first compartment adjacent said turbine and a further compartment adjacent said wall, said piston being movable in the direction of said axis in response to the esablishment of pressure differentials between the fluids in said compartments, said clutch being at least partially engaged in response to a rise of fluid pressure in said first compartment and being disengaged in response to a rise of fluid pressure in said further compartment; and mechanical means provided in said further compartment for at least partially conforming the speed of circulation of fluid in said further compartment to the rotational speed of said turbine while the clutch is at least partially disengaged.

4. The torque converter of claim 3, wherein at least said further compartment is configurated to confine an annular layer of hydraulic fluid.

5. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with said turbine and a piston disposed between said wall and said turbine, said at least one friction disc being rotatable relative to said piston and said piston dividing said chamber into a first compartment adjacent said turbine and a further compartment adjacent said wall, said piston being movable in the direction of said axis in response to the establishment of pressure differentials between the fluids in said compartments, said clutch being at least partially engaged in response to a rise of fluid pressure in said first compartment and disengaged in response to a rise of fluid pressure in said further compartment; and mechanical means provided in said further compartment for at least partially reducing differences developing between the speeds of circulation of fluids in said compartments while the clutch is at least partially disengaged.

6. The torque converter of claim 5, wherein at least one of said compartments is configurated to confine an annular layer of hydraulic fluid.

7. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element;

a lockup clutch disposed in said chamber between said wall and said turbine and including at least one friction disc rotatable with said turbine and a piston disposed between said wall and said turbine, said piston dividing said chamber into a first compartment adjacent said turbine and a further compartment adjacent said wall, said piston being movable in the direction of said axis in response to the establishment of pressure differentials between the fluids in said compartments, said clutch being at least partially engaged in response to a rise of fluid pressure in said first compartment and disengaged in response to a rise of fluid pressure in said further compartment; and mechanical means disposed between said piston and said turbine for reducing differences developing between the speeds of circulation of fluids in said compartments while the clutch is at least partially disengaged.

8. The torque converter of claim 7, wherein at least one of said compartments is configured to confine an annular layer of hydraulic fluid.

9. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element;

a lockup clutch disposed in said chamber between said wall and said turbine and including at least one friction disc rotatable with said turbine and a piston disposed between said wall and said turbine, said piston dividing said chamber into a first compartment adjacent said turbine and a further compartment adjacent said wall, said piston being movable in the direction of said axis in response to the establishment of pressure differentials between the fluids in said compartments, said clutch being at least partially engaged in response to a rise of fluid pressure in said first compartment and being disengaged in response to a rise of fluid pressure in said further compartment; and mechanical means disposed in each of said first and further compartments for reducing differences developing between the speeds of circulation of fluids in said first and further compartments while the clutch is at least partially disengaged.

10. The torque converter of claim 9, wherein at least one of said compartments is configured to confine an annular layer of hydraulic fluid.

11. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with said turbine and a piston disposed between said wall and said turbine, said at least one friction disc being rotatable relative to said piston and said piston dividing said chamber into a first compartment adjacent said turbine and a further compartment adjacent said wall, said piston being movable in the direction of said axis in response to the establishment of pressure differentials between the fluids in said compartments, said clutch being at least partially engaged in response to a rise of fluid pressure in said first compartment and being disengaged in response to a rise of flud pressure in said further compartment; and means provided in at least one of said compartments for influencing the fluid in the respective compartment to reduce the differences between forces acting in the direction of said axis upon opposite sides of said piston and developing while the clutch is at least partially disengaged.

12. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with one of said turbine and said housing and a piston disposed between said wall and said turbine, said at least one friction disc being rotatable relative to said piston and said piston dividing said chamber into a first compartment adjacent said turbine and a further compartment adjacent said wall and said piston being movable in the direction of said axis in response to the establishment of pressure differentials between the fluids in said compartments, said clutch being at least partially engaged in response to a rise of fluid pressure in one of said compartments and a resulting movement of the piston toward one of said wall and said turbine and being disengaged in response to a rise of fluid pressure in the other of said compartments entailing a movement of said piston away from the other of said wall and said turbine; and means for influencing at least one of a plurality of variable parameters including the speed of circulation of fluid in at least one of said compartments and the magnitude of forces acting upon said piston while the clutch is at least partially disengaged.

13. The torque converter of claim 12, wherein said at least one friction disc is provided with at least one friction lining and includes a portion extending substantially radially inwardly toward said axis beyond said at least one friction lining.

14. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chaber between said wall and said turbine and including at least one friction disc rotatable with one of said turbine and said housing and a piston disposed between said wall and said turbine, said piston dividing said chamber into a first compartment adjacent said turbine and a further compartment adjacent said wall and said piston being movable in the direction of said axis in response to the establishment of pressure differentials between the fluids in said compartments, said clutch being at least partially engaged in response to a rise of fluid pressure in one of said compartments and a resulting movement of the piston toward one of said wall and said turbine and being disengaged in response to a rise of fluid pressure in the other of said compartments entailing a movement of said piston away from the other of said wall and said turbine, and means for influencing at least one of a plurality of variable parameters including the speed of circulation of fluid in at least one of said compartments and the magnitude of forces acting upon said piston while the clutch is at least partially engaged, said means for influencing including a set of vanes forming part of said at least one friction disc and having radially inner portions located at a first distance from said axis and outer portions located at a second distance from said axis greater than said first distance, said at least one friction disc being provided with at least one friction lining and including a portion extending substantially radially inwardly toward said axis beyond said at least one friction lining to a location at least substantially midway between the radially inner and outer portions of said vanes.

15. The torque converter of claim 13, wherein said piston is an annular piston having a radially inner portion located at a first distance from said axis and a radially outer portion located at a second distance from said axis greater than said first distance, said at least one disc overlying at least one-half of said piston between said inner and outer portions of the piston, as seen in the direction of said axis.

16. The torque converter of claim 13, wherein said portion of said at least one disc is profiled and forms part of said means for influencing.

17. The torque converter of claim 13, wherein said portion of said at least one disc establishes at least one path for the flow of hydraulic fluid therethrough radially inwardly of said at least one friction lining.

18. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with one of said turbine and said housing and disposed between said wall and said turbine, said piston dividing said chamber into a first compartment adjacent said turbine and a further compartment adjacent said wall and said piston being movable in the direction of said axis in response to the establishment of pressure differentials between the fluids in said compartments, said clutch being at least partially engaged in response to a rise of fluid pressure in one of said compartments and a resulting movement of the piston toward one of said wall and said turbine and being disengaged in response to a rise of fluid pressure in the other of said compartments entailing a movement of said piston away from the other of said wall and said turbine; and means for influencing at least one of a plurality of variable parameters including the speed of circulation of fluid in at least one of said compartments and the magnitude of forces acting upon said piston while the clutch is at least partially disengaged, said at least one friction disc being provided with at least one friction lining and including a portion extending substantially radially toward said axis beyond said at least one friction lining, said portion of said at least one friction disc being provided with at least one vane disposed radially inwardly of said at least one friction lining and forming part of said influencing means.

19. A hydrokinetic torque converter comprising:

a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with one of said turbine and said housing and a piston disposed between said wall and said turbine, said piston dividing said chamber into a first compartment adjacent said turbine and a further compartment adjacent said wall and said piston being movable in the direction of said axis in response to the establishment of pressure differentials between the fluids in said compartments, said clutch being at least partially engaged in response to a rise of fluid pressure in one of said compartments and a resulting movement of the piston toward one of said wall and said turbine and being disengaged in response to a rise of fluid pressure in the other of said compartments entailing a movement of said piston away from the other of said wall and said turbine; and means for influencing at least one of a plurality of variable parameters including the speed of circulation of fluid in at least one of said compartments and the magnitude of forces acting upon said piston while the clutch is at least partially disengaged, said piston having a side confronting said turbine and being provided with profiles forming part of said influencing means and arranged to increase the speed of circulation of fluid about said axis when the engine is pulling a load.

20. The torque converter of claim 19, wherein at least one of said profiles at least resembles a blade.

21. A hydrokinetic torque converter comprising: a housing rotatable about a predetermined axis by an output element of an engine in a vehicle and defining a chamber for a pressurizable hydraulic fluid which circulates in response to rotation of the output element, said housing having a wall extending substantially radially of said axis between a rotary turbine of the torque converter and the output element; a lockup clutch disposed in said chamber between said wall and said turbine and including at least one friction disc rotatable with one of said turbine and said housing and a piston disposed between said wall and said turbine, said piston dividing said chamber into a first compartment adjacent said turbine and a further compartment adjacent said wall and said piston being movable in the direction of said axis in response to the establishment of pressure differentials between the fluids in said compartments said clutch being at least partially engaged in response to a rise of fluid pressure in one of said compartments and a resulting movement of the piston toward one of said wall and said turbine and being disengaged in response to a rise of fluid pressure in the other of said compartments entailing a movement of said piston away from the other of said wall and said turbine; means for influencing at least one of a plurality of variable parameters including the speed of circulation of fluid in at least one of said compartments and the magnitude of forces acting upon said piston while the clutch is at least partially disengaged; and a pump adjacent to and defining with said turbine an additional flud-containing compartment, said turque converter further having at least one passage for the flow of hydraulic fluid between said first compartment and said additional compartment.

22. The torque converter of claim 21, wherein said turbine includes a hub and said at least one passage is disposed radially inwardly of said hub.

23. The torque converter of claim 21, wherein said turbine has a hub and said at least one passage is provided in said hub.

* * * * *

UNITED STATES PATENT AND TRADEMARK OFFICE
CERTIFICATE OF CORRECTION

PATENT NO. : 5,613,582
DATED : March 25, 1997
INVENTOR(S) : Johann JACKEL

It is certified that error appears in the above-indentified patent and that said Letters Patent is hereby corrected as shown below:

Title page, [75], Inventor:, change "Herr J. Jackel" to --Johann Jackel--.

Signed and Sealed this

Fifth Day of August, 1997

Attest:

BRUCE LEHMAN

Attesting Officer

Commissioner of Patents and Trademarks